Jan. 12, 1926.
F. A. GAUGER
OVEN REGULATOR
Filed May 24, 1924
1,569,474
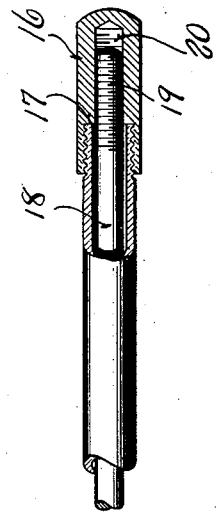
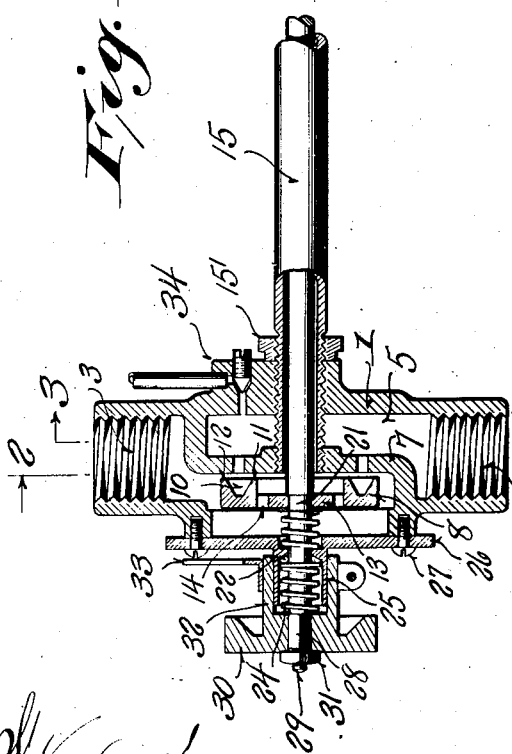
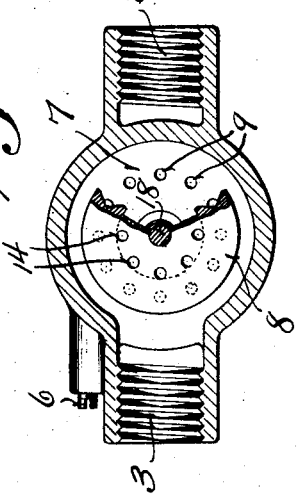
Inventor:
Frank A. Gauger Patented Jan. 12, 1926.

1,569,474

UNITED STATES PATENT OFFICE.

FRANK A. GAUGER, OF MILWAUKEE, WISCONSIN.

OVEN REGULATOR.

Application filed May 24, 1924. Serial No. 715,542.

*To all whom it may concern:*

Be it known that I, FRANK A. GAUGER, a citizen of the United States, and resident of Milwaukee, in the county of Milwaukee and State of Wisconsin, have invented certain new and useful Improvements in Oven Regulators; and I do hereby declare that the following is a full, clear, and exact description thereof.

This invention relates to oven regulators and is particularly directed to a regulator for gas ovens.

In gas oven regulators as heretofore constructed great difficulty has been experienced due to the binding and cutting of the valve and valve seat which resulted from the positive forcing of the valve into the closed position upon contraction of the control element. A further difficulty has arisen from the inability to clean the valve without disturbing the adjustment when the parts were repositioned, and inasmuch as these valves were not self-cleaning, they soon gave a mamaterial amount of trouble.

This invention is designed to overcome the above noted defects, and objects of such invention are to provide an oven regulator in which the valve is seated yieldingly by means of a spring, in which there is no cutting of the valve and valve seat, in which the valve automatically cleans itself, and in which the parts may be readily removed to provide access to the valve, and may be as readily repositioned with absolute assurance that the exact adjustment has not been disturbed.

Further objects are to provide an oven regulator in which an annular valve is employed which has an extremely large capacity for a very small movement, in which there is no gas pressure in the thermostatic tube, in which the gas pressure is on the side of the valve remote from the stuffing box, in which the regulator works through the seat of the valve or corresponding portion without leaking and without requiring a stuffing box at this point.

Further objects are to provide a bypass for maintaining the light even if the regulator should be suddenly closed, and to provide a pilot light which, when the main supply of gas is cut off from the regulator, will continue to burn irrespective of the position of the regulator.

An embodiment of the invention is shown in the accompanying drawings, in which:—

Figure 1 is a view of the regulator detached, with the main portion or body thereof in section.

Figure 2 is a view of a modified form, such view corresponding to a section on the line 2—2 of Figure 1.

Figure 3 is a view of a modified form, such view corresponding to a section on the line 3—3 of Figure 1.

The regulator comprises a body portion 1 having a threaded inlet 2 and a threaded outlet 3 adapted to receive the supply pipe and the pipe leading to the burner, respectively. A bypass 4 is provided between the interior cavity 5 of the body portion and a pilot light pipe. This bypass is controlled by means of a screw 6, as shown in Figure 3, and is adapted to supply a minimum quantity of gas to the burner irrespective of the operation of the thermostatic control.

The body portion is divided by a partition 7 which forms a seat for an annular valve 8. This partition is provided with a plurality of holes 9 arranged in a circle and the annular valve is provided with an annular recess 10 defined by an inner and an outer lip 11 and 12, respectively. The valve is provided with a central web 13 provided with a plurality of apertures 14 arranged in a circle about the central portion.

A thermostatic tube 15 has its inner end threaded through both the wall 7 and one side of the body portion 1, as clearly shown in Figure 1. It it provided with a threaded terminal portion adapted to receive an internally threaded cap 16, such cap being provided with a shoulder 17 abutting the end of the tube 15, and thus positively defining the relative positioning of the cap and the tube. A relatively non-expansible rod 18 is provided with a threaded end 19 received in an internally threaded aperture 20 in the cap 16. The threads for the rod and for the tube are of the same pitch so that the cap may be simultaneously screwed upon the rod and upon the tube, thus insuring the same relative positioning of the tube and rod at their attached ends.

The rod 18 extends forwardly through the tube 15 and is provided with a reduced portion 21 forming a shoulder against which the inner side of the web 13 of the valve bears. A coil spring 22 presses inwardly against the inner side of the valve, preferably a washer being interposed. The outer end of the spring bears against the plate 26. The plate 26 is circular and is held in place by means of a plurality of screws 27 threaded into the body portion. The plate 26 continues outwardly to form a cup 25 for the packing 22, such packing being held in place by a spring 24 bearing at one end against a washer in contact with the packing. The outer end of the rod 18 is squared, as indicated at 28, and is provided with a threaded reduced stem 29. An adjusting hand wheel 30 is provided with a squared opening which fits over the squared portion of the rod, and a nut 31 is screwed upon the threaded extension or spindle of the rod and holds the hand wheel in position. The hand wheel is provided with an annular or sleeve like portion 32 which overhangs or overlaps the cup 25. A pointer 33 is clamped about the portion 31 of the hand wheel and is adapted to cooperate with legends formed upon the plate 26 to indicate the temperature at which the thermostatic device will hold the oven.

If desired, a bypass 34 may be connected with the inlet side of the control device, and may be led to a point in proximity to the burners in order to cause initial ignition when the gas is first supplied the burners.

The operation of the apparatus is as follows:—Assuming that the burners have been lighted and the thermostatic device set at a desired temperature, the thermostatic tube 15 expands at a greater rate than the rod 18 and consequently draws the valve 8 inwardly thus constricting the passageway for the incoming gas and cutting down the total heat furnished by the burners. In this connection, it is to be particularly noted that this annular valve provides a very large cross sectional area variation for a small movement. The valve, it will be noted, allows an annular sheet of gas to flow both outwardly and inwardly and allows the inwardly flowing gas to pass outwardly through the apertures 14 in the valve web. Further, by providing the annular lips 11 and 12 a very accurate seating of the valve is attained. If the thermostatic element completely seats the valve, it is to be noted that any further motion of such thermostatic portion does not cause a severe binding between the valve and the valve seat as the spring 22 yieldingly seats the valve and allows any subsequent motion of the rod 18 relatively to the valve to be taken up by the spring without damaging either the valve or the seat.

It is to be particularly noted that when the valve is screwed down by manipulating the control handle 30 that there is a slight rotary motion of the valve with reference to the seat at the time the valve actually seats. This causes the valve to clean itself each time that it is so operated, and insures an accurate and perfect seating at all times.

A further point that is particularly emphasized is the readiness with which the device may be cleaned or with which access may be had to the valve and valve seat. It is merely necessary to remove the screws 27 of the plate 26 and to unscrew the cap 16 from both the tube 15 and the rod 18. The rod, valve, plate 26 and associated parts may be readily withdrawn outwardly from the apparatus thus exposing the valve seat in its entirety and also providing the most ready access to the valve. When the parts are repositioned, it is merely necessary to screw the cap into place; and replace the screws 27, and when this is done accurate relative repositioning of the rod and tube is assured.

If it is desired to set the device at any other temperature, the handle 30 is rotated thus screwing the rod 18 into or out of the cap 16 and causing a change in the relative positioning of the rod 18 and tube 15. It is to be noted that the cap 16 is screwed tightly into place with the shouldered portion 17 thereof in tight engagement with the end of the tube 15. Thus there will be no relative unscrewing of the cap with relation to the tube.

It is to be noted in this connection that the adjustment, or initial relative adjustment, of the rod and tube is secured at the regulating handle 30 by merely loosening the clamp of the pointer 33 and turning the handle the desired amount, thereafter, locking the pointer to the handle.

It will be seen, therefore, that no adjustment is required at the outer end of either the tube or the rod, and that thus there is no danger of upsetting the adjustment when a pan or other article strikes against the outer end of the device.

If it is found desirable a lock nut 15' may be screwed upon the tube 15 and may bind against the body portion 1 to thus lock the tube in position.

Although the invention has been described in considerable detail, it is to be understood that the invention may be variously embodied and is, therefore, to be limited only as claimed.

I claim:

1. A thermostatic regulator for gas ovens comprising a hollow body portion having a transverse apertured web, a tube screwed into said body portion and extending through said web, a rod carried within said tube and secured to the outer end thereof, said rod extending through said body portion and provided with a shouldered part, a valve carried by said rod and adapted to cooperate with the apertured web to control the flow of gas, and a spring normally holding said valve against the shoulder portion of said rod.

2. A thermostatic regulator for gas ovens comprising a hollow body portion having a transverse apertured web, a tube screwed into said body portion and extending through said web, a rod carried within said tube and secured to the outer end thereof, said rod extending through said body portion and provided with a shouldered part, a valve carried by said rod and adapted to cooperate with the apertured web to control the flow of gas, and means for varying the relative position of said rod and tube.

3. A thermostatic control for gas ovens comprising a hollow body portion having a transverse web provided with a plurality of apertures therethrough forming a circle, an annular valve having a groove therein positioned opposite said apertures and provided with an apertured web, a tube passing through one side of said body portion and said web, a rod carried within said tube and having a relative threaded engagement with the outer end of said tube, and having a shouldered portion cooperating with the web of said valve, a spring surrounding said rod and tending to hold said valve in engagement with said shouldered portion, and a handle provided with a pointer, said handle being located upon the outer side of said body portion and rigidly attached to said rod.

4. A thermostatic regulator for gas ovens comprising a hollow body portion having a transverse apertured web, a tube screwed into said body portion, a rod carried within said tube and secured to the outer end thereof, said rod extending through said body portion and provided with a shouldered part, a valve carried by said rod and adapted to cooperate with the apertured web to control the flow of gas, and a spring normally holding said valve against the shoulder portion of said rod.

5. A thermostatic regulator for gas ovens comprising a body portion having a hollow central part separated by a transverse web, an inlet communicating with said body portion on one side of said web, an outlet communicating with the body portion on the other side of said web, said web having an annular series of apertures, a valve comprising a central spider, and an inwardly directed flange, said flange having a groove therein positioned directly opposite said annularly arranged apertures, and thermostatic means for moving said valve towards or away from said web.

In testimony that I claim the foregoing I have hereunto set my hand at Milwaukee, in the county of Milwaukee and State of Wisconsin.

FRANK A. GAUGER.